United States Patent
Ferguson

(10) Patent No.: US 12,384,154 B2
(45) Date of Patent: Aug. 12, 2025

(54) INKJET PRINTHEAD PROTECTION APPARATUS

(71) Applicant: Canon U.S.A., Inc., Melville, NY (US)

(72) Inventor: David B. Ferguson, Boca Raton, FL (US)

(73) Assignee: Canon U.S.A., Inc., Melville, NY (US)

( * ) Notice: Subject to any disclaimer, the term of this patent is extended or adjusted under 35 U.S.C. 154(b) by 112 days.

(21) Appl. No.: 18/149,938

(22) Filed: Jan. 4, 2023

(65) Prior Publication Data

US 2023/0286276 A1 Sep. 14, 2023

Related U.S. Application Data

(60) Provisional application No. 63/305,871, filed on Feb. 2, 2022.

(51) Int. Cl.
| | |
|---|---|
| *B41J 2/165* | (2006.01) |
| *B32B 3/08* | (2006.01) |
| *B32B 3/18* | (2006.01) |
| *B32B 7/12* | (2006.01) |
| *B32B 15/04* | (2006.01) |
| *B41J 2/14* | (2006.01) |
| *B32B 27/06* | (2006.01) |
| *B32B 27/08* | (2006.01) |
| *B32B 27/10* | (2006.01) |

(Continued)

(52) U.S. Cl.
CPC ............ *B41J 2/16508* (2013.01); *B32B 3/08* (2013.01); *B32B 3/18* (2013.01); *B32B 7/12* (2013.01); *B41J 2/1433* (2013.01); *B32B 15/04* (2013.01); *B32B 27/06* (2013.01); *B32B 27/08* (2013.01); *B32B 27/10* (2013.01); *B32B 27/304* (2013.01); *B32B 27/32* (2013.01); *B32B 29/002* (2013.01); *B32B 2307/208* (2013.01); *B32B 2571/00* (2013.01)

(58) Field of Classification Search
CPC ....... B41J 2/16508; B41J 2/1433; B32B 3/08; B32B 3/18; B32B 7/12; B32B 15/04; B32B 27/06

See application file for complete search history.

(56) References Cited

U.S. PATENT DOCUMENTS

| | | | | |
|---|---|---|---|---|
| 4,045,802 | A | * | 8/1977 | Fukazawa ............ B41J 2/16505 347/29 |
| 2005/0103902 | A1 | * | 5/2005 | Hornsell ............. F16K 31/0655 239/585.1 |

OTHER PUBLICATIONS

Digiprint Supplies, Kyocera Inkjet Printhead KJ4A-0300, https://www.digiprint-supplies.com/en/kyocera-inkjet-printhead-kj4a-0300, Apr. 2021.

(Continued)

*Primary Examiner* — Jason S Uhlenhake
(74) *Attorney, Agent, or Firm* — Canon U.S.A., Inc. IP Division

(57) ABSTRACT

Some embodiments of a protector apparatus for protecting a printhead having a nozzle plate include a protection layer, a spacer layer, a flexible magnetic layer having a first surface and a second surface opposing the first surface, and a handle connected to one end of the flexible magnetic layer. The spacer layer is sandwiched between the protection layer and the first surface of the flexible magnetic layer. The handle is connected to the second surface of the flexible magnetic layer. The protector apparatus can be magnetically attached to the printhead in such a manner that the first protection layer covers the nozzle plate.

17 Claims, 13 Drawing Sheets

(51) Int. Cl.
    *B32B 27/30*     (2006.01)
    *B32B 27/32*     (2006.01)
    *B32B 29/00*     (2006.01)

(56) References Cited

OTHER PUBLICATIONS

Negi Sign Systems & Supplies Co., Kyocera KJ4A print head, https://negisign.com/product/kyocera-kj4a-print-head/, 2020.

* cited by examiner

INKJET PRINTHEAD PROTECTION APPARATUS

CROSS-REFERENCE TO RELATED APPLICATIONS

This application claims the benefit of U.S. Application No. 63/305,871, which was filed on Feb. 2, 2022.

BACKGROUND

Field

The present disclosure concerns inkjet printheads, and more specifically a protection apparatus for an inkjet printhead.

Description of the Related Art

Inkjet-printhead nozzle plates can easily be damaged if they come in contact with objects that can dent, scratch, or otherwise physically damage the delicate surface of the inkjet-printhead nozzle plates. Additionally, it is known to keep the printhead nozzles on the plate moist and free from debris.

Existing devices to mitigate such damage include a heavy, structurally sound mechanical device (plate) that is installed onto the printhead over the nozzle plate to protect the nozzle plate's surface. The device (protector/protection device) is fastened to the printhead using screws at each end of the printhead structure. The protector has a metal base plate, a low durometer pad that has an elevated fence of the same material around its perimeter, a first plastic foil that is positioned over the fence and that is secured over the pad. Additionally, a second plastic foil is applied directly to a moistened and clean nozzle plate and is secured by the surface tension of the moisture.

Within the protector, the printhead is mated to the low durometer pad that has an elevated perimeter fence. The perimeter surface of the printhead, which is absent of nozzles, mates with the elevated perimeter fence, and the first and second plastic foils are mated. When attached to the protector, the printhead-nozzle plate perimeter rests on the low durometer perimeter with the first and second foils in between to form a protector that has a moisture seal.

This protector is useful for shipping and storage; however, it cannot remain installed on the printhead during printhead installation or removal on many printers. Therefore, the printhead is exposed and unprotected during installation and removal.

SUMMARY

According to one aspect of the present disclosure is a protector apparatus for protecting a printhead having a nozzle plate. The protector apparatus includes a protection layer, a spacer layer, a flexible magnetic layer having a first surface and a second surface opposing the first surface, and a handle connected to one end of the flexible magnetic layer. The spacer layer is sandwiched between the protection layer and the first surface of the flexible magnetic layer. The handle is connected to the second surface of the flexible magnetic layer. The protector apparatus can be magnetically attached to the printhead in such a manner that the protection layer covers the nozzle plate.

According to another aspect of the present disclosure is a protector apparatus for protecting a printhead having a nozzle plate. The protector apparatus includes a flexible magnetic layer having a first side, a second side opposing the first side, and a perimeter, wherein the flexible magnetic layer has a platform that lies along the perimeter of the first side to define a depression in a central portion of the first side. The protector apparatus also includes a protection layer. The protection layer is provided on the platform. A handle is connected to one end of the flexible magnetic layer on the second side. The platform and the cavity are sized such that, when the platform contacts a printhead, a nozzle plate of the printhead does not contact the platform.

According to another aspect of the present disclosure is an apparatus that comprises a printhead and a protector apparatus. The printhead has a nozzle plate on a nozzle-plate side. The protector apparatus is magnetically held to the nozzle-plate side of the printhead. And the protector apparatus includes a protection layer, a flexible magnetic layer having a first surface on a first side and a second surface on a second side opposite to the first side, and a handle connected to one end of the protector apparatus. The protection layer is on the first side of the flexible magnetic layer. The handle is on the second side of the flexible magnetic layer. The first side of the protector apparatus faces the nozzle-plate side of the printhead. A length of the protector apparatus does not exceed a length of the nozzle-plate side, and a width of the protector apparatus does not exceed a width of the nozzle-plate side Further features of the present disclosure will become apparent from the following description of exemplary embodiments (with reference to the attached drawings).

DETAILED DESCRIPTION

The following paragraphs describe certain explanatory embodiments. Other embodiments may include alternatives, equivalents, and modifications. Additionally, the explanatory embodiments may include several features, and a particular feature may not be essential to some embodiments of the devices, systems, and methods that are described herein. Furthermore, some embodiments include features from two or more of the following explanatory embodiments.

Also, as used herein, the conjunction "or" generally refers to an inclusive "or," though "or" may refer to an exclusive "or" if expressly indicated or if the context indicates that the "or" must be an exclusive "or." And, as used herein, the terms "first," "second," and so on, do not necessarily denote any ordinal, sequential, or priority relation and may be used to more clearly distinguish one member, operation, element, group, collection, set, etc. from another without expressing any ordinal, sequential, or priority relation.

Figure 1A:
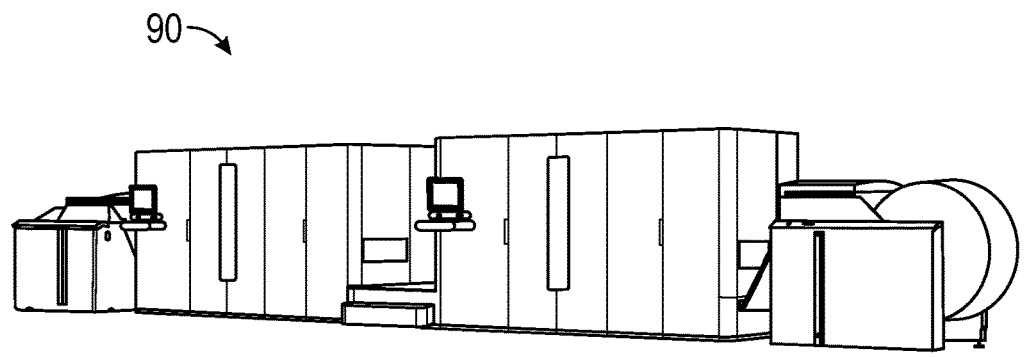
FIG. 1A illustrates an example embodiment of a printer.

FIG. 1A illustrates an example embodiment of a printer. The printer 90 is configured to form images, graphics, and text on various print media by applying ink to the print media. The printer 90 uses one or more printheads to apply the ink.

Figure 1B:
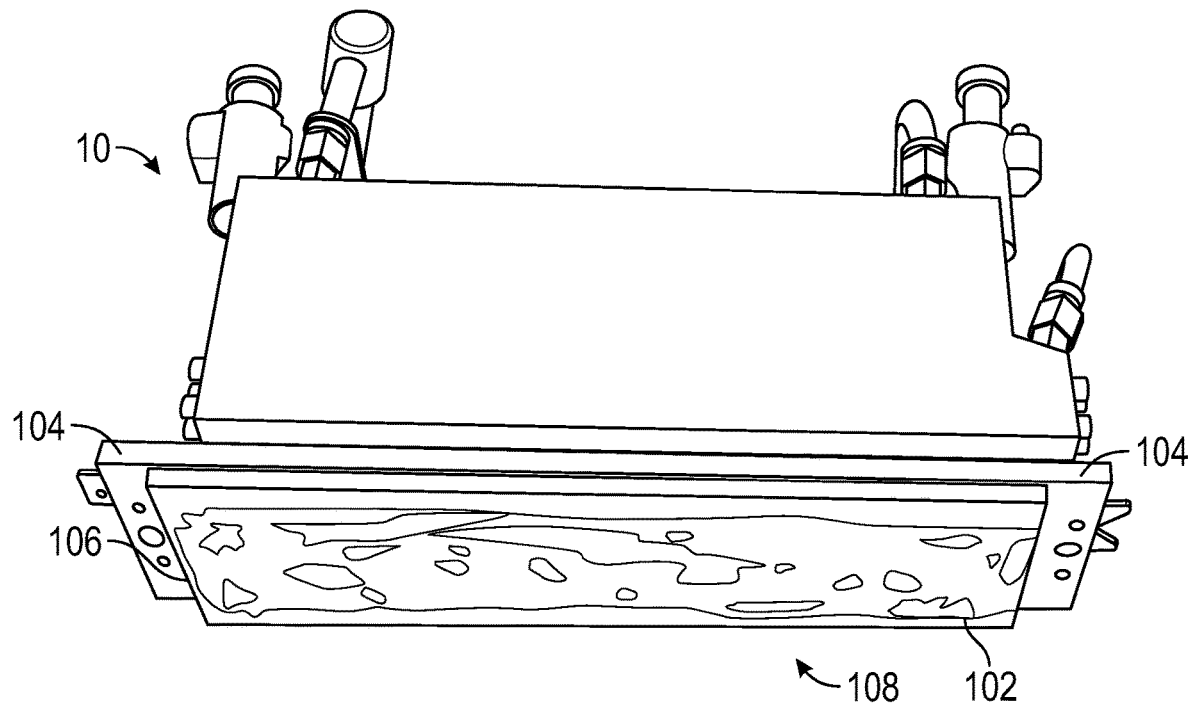
FIG. 1B is a perspective view of an example embodiment of a printhead.

FIG. 1B is a perspective view of an example embodiment of a printhead 10. The printhead 10 includes a nozzle plate 102, which includes a nozzle area that has a plurality of nozzles, and two mounting members 104, which include respective openings. The nozzle plate 102 is located on a nozzle-plate side 108 of the printhead 10, which is the side of the printhead 10 that faces print media. The mounting members 104 can be affixed to mounting structures in the printer 90, for example by screws (e.g., the screws 1033 in FIG. 4A) that pass through the openings. In FIG. 1B, a protection foil 106 covers the nozzle plate 102.

Figure 2A:
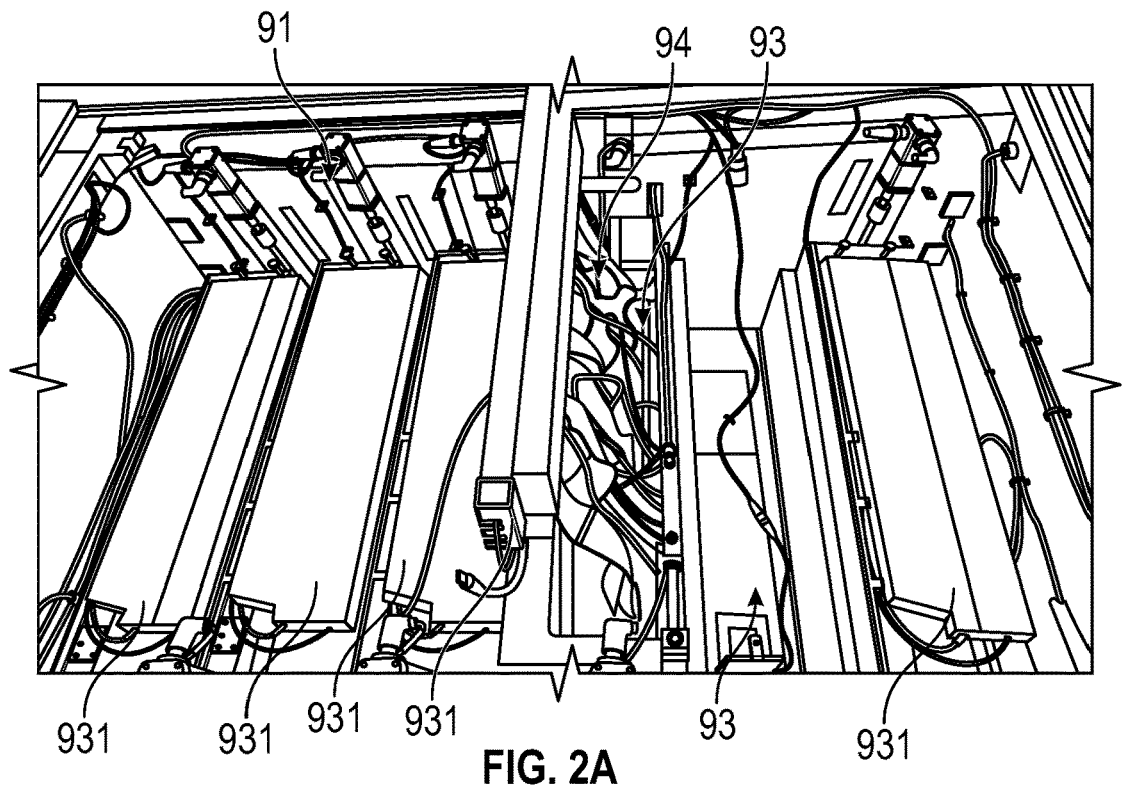
FIG. 2A illustrates an example embodiment of a printhead bay.

The printer 90 includes a printhead bay 91 that provides access to install and remove printheads 10. For example, FIG. 2A illustrates an example embodiment of a printhead bay 91. This embodiment of a printhead bay 91 includes six printhead compartments 93, although some embodiments include more or fewer printhead compartments 93. Each printhead compartment 93 has a respective cover 931. In FIG. 2A, one of the covers 931 is open, which exposes the hardware (including the other (non-printhead) hardware 94, which is described below) that is inside of the printhead compartment 93. Also, one of the printhead compartments 93 has no cover and is empty.

Figure 2B:
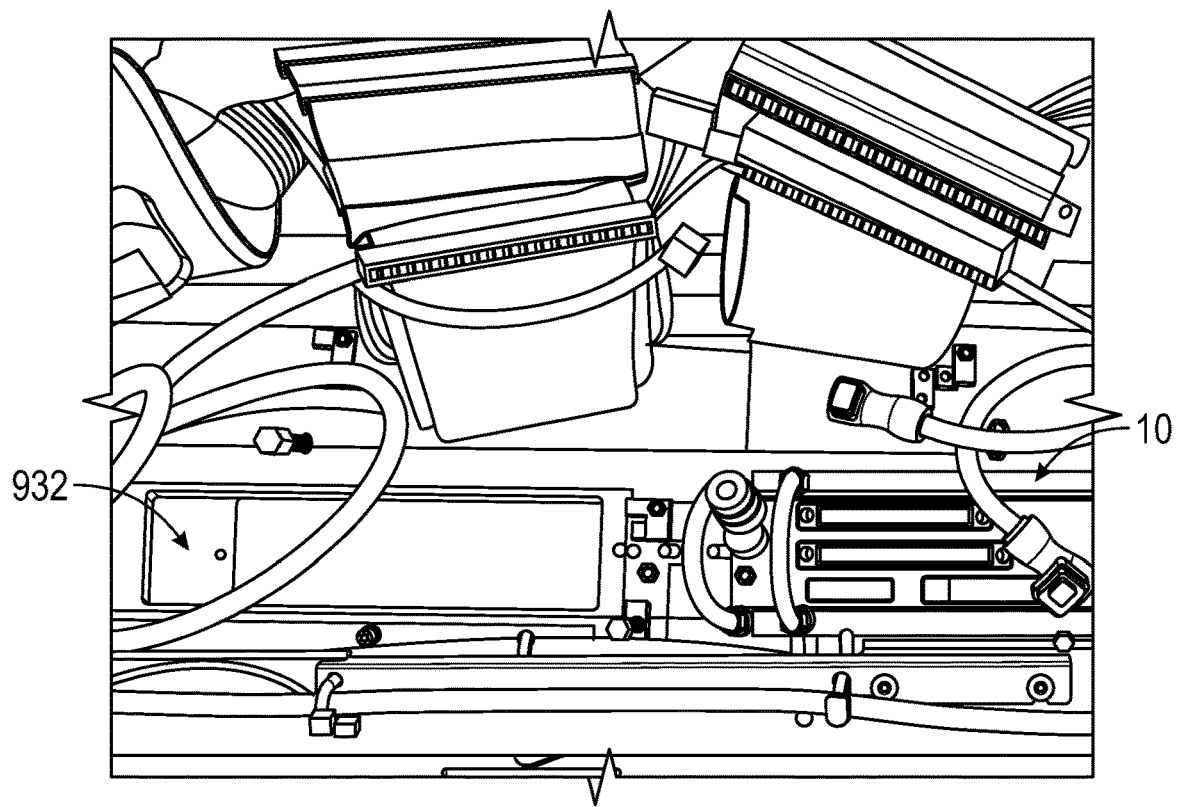
FIG. 2B illustrates an example embodiment of a printhead compartment.

FIG. 2B illustrates an example embodiment of a printhead compartment 93. The printhead compartment 93 includes a mounting cutout 932. When a printhead 10 is installed in the printhead compartment 93, the nozzle plate 102 of the printhead 10 is aligned with or inserted through the mounting cutout 932. This allows the nozzles of the printhead 10 to eject ink out of the printhead compartment 93 and onto print media. Also, the compartment 93 in FIG. 2B includes an installed printhead 10.

Figure 3B:
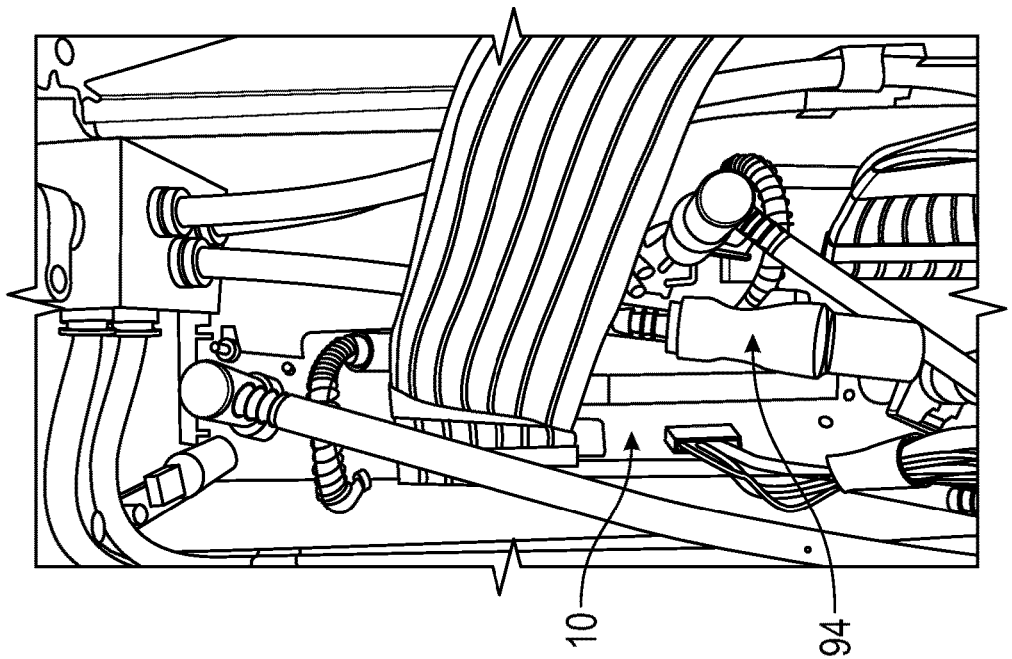
FIG. 3B illustrates an example embodiment of a printhead compartment in which a printhead has been installed.
Figure 3A:
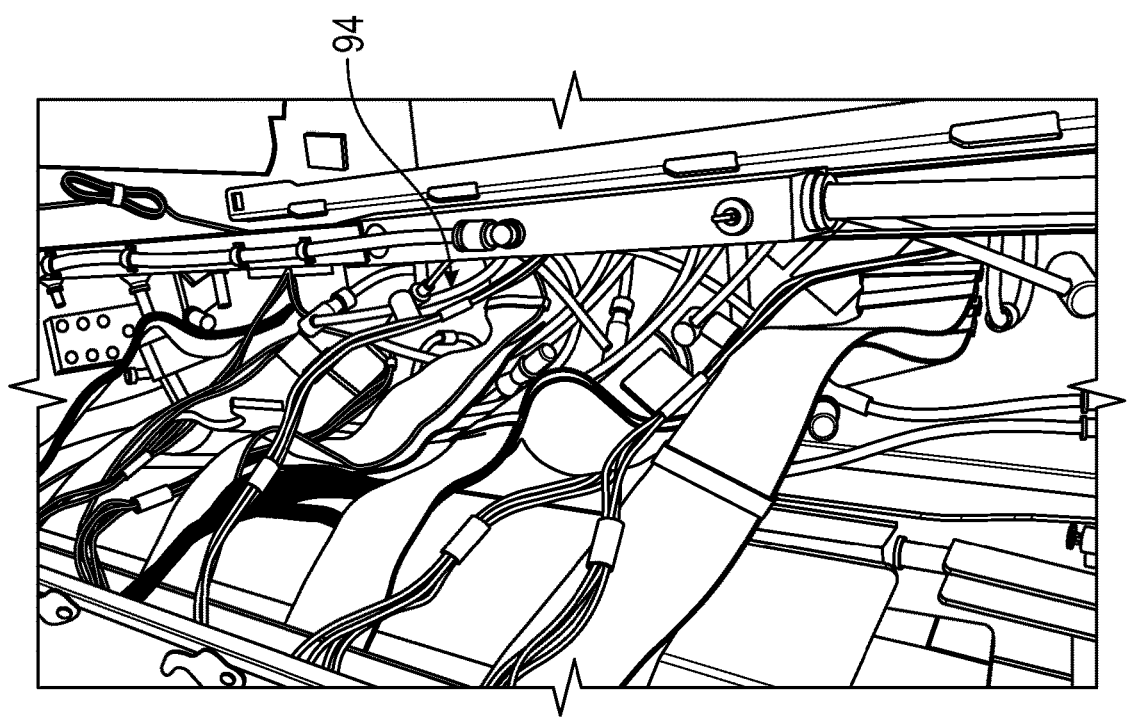
FIG. 3A illustrates an example embodiment of a printhead compartment.

The printhead compartment 93 also includes other hardware. For example, FIG. 3A illustrates an example embodiment of a printhead compartment 93, and FIG. 3A shows the other hardware 94, such as cables, other wires, and hoses. When a printhead 10 is installed in the printhead compartment 93, the printhead 10 must be maneuvered through or around the other hardware 94. For example, FIG. 3B illustrates an example embodiment of a printhead compartment 93 in which a printhead 10 has been installed. As shown in FIG. 3B, the installed printhead 10 had to be maneuvered through or around the other hardware 94 during installation. Also, because some of the other hardware 94 is positioned between the printhead 10 and the opening of the printhead compartment 93, removing the printhead 10 requires maneuvering the printhead 10 through or around the other hardware 94.

Because the nozzle plate 102 (and the nozzle area 103 in particular) is very delicate, and because the printhead 10 has to be maneuvered though or around the other hardware 94 in the printhead compartment 93, the nozzle plate 102 can easily be damaged during installation or removal.

Accordingly, a flexible protector apparatus, as described below, can be used to protect the nozzle plate 102 during installation or removal of the printhead 10. Also, the flexible protector apparatus can be used to protect the nozzle plate 102 while the printhead 10 is being transported or stored. Furthermore, the flexible protector apparatus can be used to keep the nozzle plate 102 moist and free from debris.

Figure 4A:
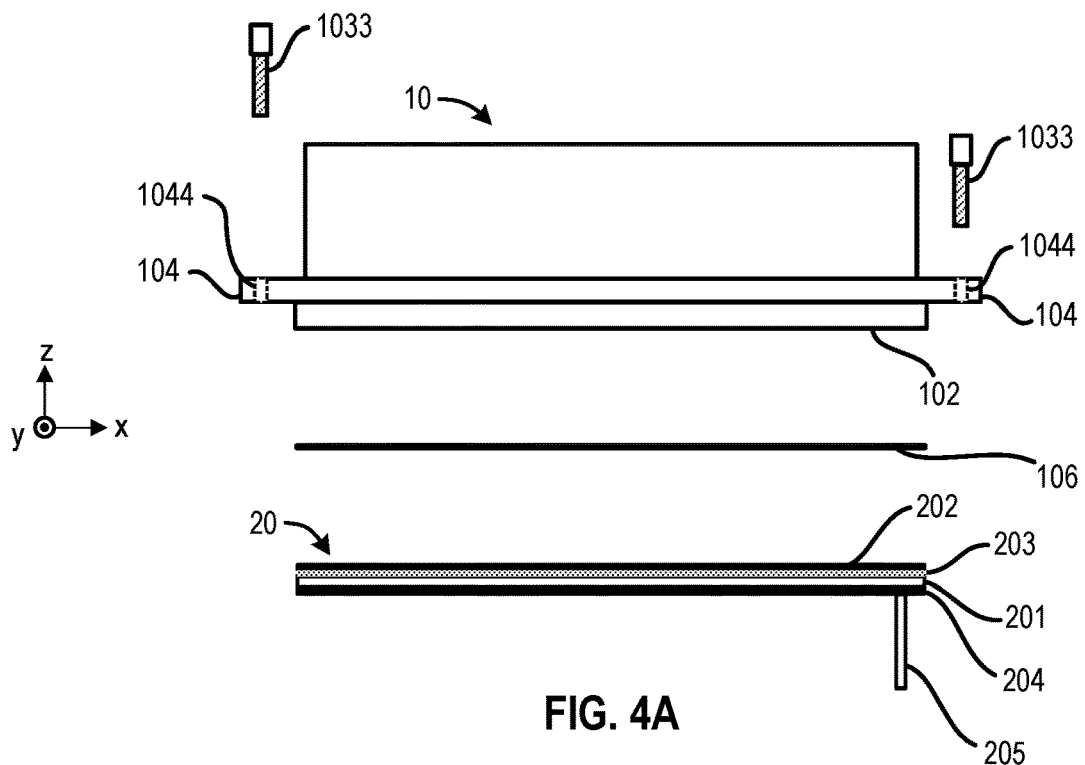
FIG. 4A illustrates an example embodiment of a printhead and a flexible protector apparatus.
Figure 4B:
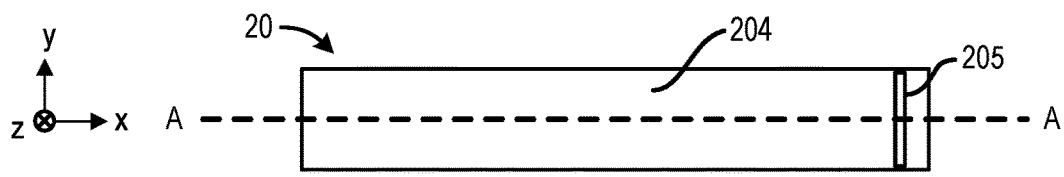
FIG. 4B illustrates another view of the protector apparatus from FIG. 4A.
Figure 4C:
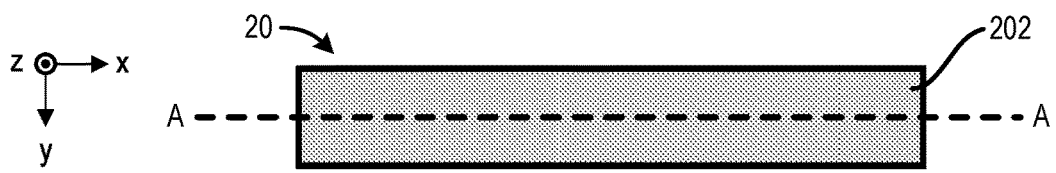
FIG. 4C illustrates another view of the protector apparatus from FIG. 4A.
Figure 4D:
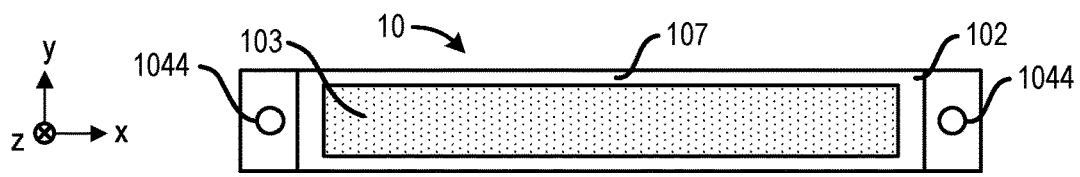
FIG. 4D illustrates another view of the printhead from FIG. 4A.

FIG. 4A illustrates an example embodiment of a printhead 10 and a flexible protector apparatus 20 (which is also referred to herein by "protector apparatus 20"). And FIG. 4B illustrates another view of the protector apparatus 20 from FIG. 4A, from a viewpoint looking upward along the z axis; FIG. 4C illustrates another view of the protector apparatus 20 from FIG. 4A, from a viewpoint looking downward along the z axis; and FIG. 4D illustrates another view of the printhead 10 from FIG. 4A, from a viewpoint looking upward along the z axis. Thus, the views of FIGS. 4B-D are orthogonal to the view of FIG. 4A.

The printhead 10 includes a nozzle plate 102, which includes a nozzle area 103 that has a plurality of nozzles, and two mounting members 104, which include respective openings 1044. The nozzle plate 102 is located on a nozzle-plate side 108 of the printhead 10, which is the side of the printhead 10 that faces print media. The mounting members 104 can be affixed to mounting structures in the printer 90, for example by screws 1033 that pass through the openings 1044.

Also, FIG. 4A illustrates a protection foil 106 (e.g., a plastic foil) that can be applied to the nozzle plate 102 (e.g., the nozzle area 103). The protection foil 106 can be placed on a moistened nozzle plate 102 and held to the nozzle plate 102 by the surface tension of the moisture.

The protector apparatus 20 includes a magnetic layer 201, a protection layer 202, a spacer layer 203, a distal layer 204, and a handle 205.

The magnetic layer 201 is flexible and magnetic. The magnetic layer 201 may be composed of one or more flexible magnets. For example, flexible magnets include a high-coercivity ferrimagnetic or ferromagnetic compound that has been mixed with a plastic binder and extruded as a sheet, thereby forming a flexible magnetic sheet. And the magnetic layer 201 may include multiple layers (e.g., multiple flexible magnetic sheets that have been layered). Also, the magnetic layer 201 may be composed of a plurality of rigid magnets that are attached to each other at flexible joints such that that magnetic layer 201 can bend and the rigid magnets can articulate relative to each other.

The thickness, durometer, and degree of flexibility of the magnetic layer 201 influence the level of protection from contact with objects that can damage the nozzle plate 102. For example, in some embodiments the thickness of the magnetic layer 201 is 0.01, 0.02, 0.05, 0.06, 0.07, 0.08, 0.09, 0.10, 0.12, 0.14, 0.16, 0.18, 0.2, 0.3, 0.5, 0.7, 0.9, or 1 inch.

And the thickness of the magnetic layer 201 may be related to the flexibility: a thinner magnetic layer 201 may be more flexible, and accordingly a thinner magnetic layer 201 may have a smaller bending radius than a thicker magnetic layer 201. A thinner magnetic layer 201 may make separating the protector apparatus 20 from the printhead 10 easier when compared to separating protector apparatuses 20 that have a thicker magnetic layer 201 from the printhead 10. However, a thicker magnetic layer 201, while stiffer, may provide greater protection from some kinds of damage. Therefore, the thickness of the magnetic layer 201 may vary between various embodiments according to the expected conditions of use of the protector apparatus 20.

Also, the magnetic strength of the magnetic layer 201 may be selected to avoid damaging the nozzle plate 102. For example, the magnetic layer 201 may have a magnetic strength that is low enough to prevent the magnetic layer 201 from separating (e.g., delaminating, peeling off) some or all of the nozzle plate 102 (e.g., some or all of the nozzle area 103) from the rest of the printhead 10 when the protector apparatus 20 is separated from the nozzle plate 102, yet strong enough to hold the protector apparatus 20 to the printhead 10 until a user separates the protector apparatus 20 and the printhead 10.

The protection layer 202 is a foil (film), for example a low-friction flexible plastic foil. The protection layer 202 may also be thinner than the magnetic layer 201, for example less than 0.01 inch (e.g., 0.005 inch). The surface of the protection layer 202 that faces the magnetic layer 201 (which is the surface opposite to the surface that faces the printhead 10) may have an adhesive. Furthermore, the protection layer 202 may be slippery and may have a high molecular weight, for example an ultra-high molecular weight (UHMW) polyethylene film (or foil).

When the protector apparatus 20 is attached to the printhead 10 (magnetically held in contact with the printhead 10), the protection layer 202 contacts the nozzle plate 102 (when the printhead 10 does not have the plastic protection foil 106) or contacts the plastic protection foil 106 (when the printhead does have the plastic protection foil 106). The protection layer 202 may act as the plastic protection foil 106 when the printhead 10 does not have the plastic protection foil 106, and thus the plastic protection foil 106 is unnecessary to protect or moisten the nozzle plate 102 in some embodiments.

Accordingly, some embodiments of protector apparatuses 20 include a protection layer 202 that is a thin plastic foil lamination. Such protector apparatuses 20 have a smooth surface that can contact the nozzle plate 102 like the plastic protection foil 106. Therefore, some embodiments of the protector apparatus 20 combine protection against contact damage with the protection layer 202 in an integrated unit. Also, some embodiments of the protector apparatus 20 can keep the nozzle plate 102 wet without the plastic protection foil 106.

Furthermore, some embodiments may exclude the protection layer 202, and the magnetic layer 201 can act as a moisture barrier. But, depending on the surface of the magnetic layer 201, the protection layer 202 can further reduce wear to the nozzle plate 102 from friction caused by dragging the protector apparatus 20 across the nozzle plate 102 (e.g., during the installation or removal of the printhead 10).

The spacer layer 203 is sandwiched between the protection layer 202 and the magnetic layer 201. The spacer layer 203 is composed of one or more flexible materials and may be a softer material (low-durometer material) that provides extra cushioning. Examples of materials that may be included in the spacer layer 203 include the following: paper, tape (e.g., blue tape, PVC electrical tape, polypropylene packaging tape), and plastic films (e.g., polyethylene).

The spacer layer 203 may be used to adjust the magnetic strength that the magnetic layer 201 applies to the printhead 10 by increasing the distance between the magnetic layer 201 and the printhead 10. Thus, the thickness and materials of the spacer layer 203 may be selected such that the magnetic strength that the magnetic layer 201 applies to the printhead 10 is within a desired range. Also, because even a slight increase in the distance between the magnetic layer 201 and the printhead 10 may significantly reduce the strength of the magnetic field at the printhead 10, the spacer layer 203 can also be very thin.

Some embodiments do not include the spacer layer 203. To obtain a desired strength of the magnetic field at the printhead 10, the thickness of the protection layer 202 can be adjusted. Thus, some embodiments of the protection layer 202 also perform the function of the spacer layer 203. And the magnetic layer 201 can also be constructed to exert a desired magnetic strength on the printhead 10.

The distal layer 204 is located on the surface of the magnetic layer 201 that faces away from the printhead 10. The distal layer 204 may have a higher durometer than the magnetic layer 201, and thus may be harder than the magnetic layer 201. The distal layer 204 may increase the protection provided by, as well as the thickness of, the protector apparatus 20. Examples of materials that may be included in the distal layer 204 include plastic (e.g., PVC, polypropylene, polyethylene) and metal.

The respective thicknesses of the magnetic layer 201 and the distal layer 204 may vary between embodiments. Embodiments of the protector apparatus 20 that have a thicker distal layer 204 may have a thinner magnetic layer 201, and embodiments of the protector apparatus 20 that have a thinner distal layer 204 may have a thicker magnetic layer 201. A thicker distal layer 204 with a thinner magnetic layer 201 may provide greater nozzle-plate protection for the same thickness of the protector apparatus 20, but may also reduce the flexibility.

A more-flexible protector apparatus 20 may be more advantageous in some circumstances, for example when the clearance around an installed printhead 10 is very small and the protector apparatus 20 is being removed after the printhead 10 is installed. For example, a protector apparatus 20 that is sufficiently flexible can be peeled off of the printhead 10, rather than slid off. And, if a user (e.g., field technician) forgets to remove the protector apparatus 20, a thinner protector apparatus 20 may cause less damage to the printer 90 if the printhead 10 is lowered to print media when the protector apparatus 20 is still magnetically held to the printhead 10. Also, a less-flexible protector apparatus 20 may be advantageous in some circumstances, for example when a printhead 10 is going to be shipped a long distance or stored for a long time.

The magnetic layer 201, the protection layer 202, the spacer layer 203, and the distal layer 204 may be held together by one or more adhesives. The adhesive, as well as the thickness of the applied adhesive, may be selected according to their bonding strengths, rigidities (when cured), and chemical resistances. Examples of adhesives include epoxies, cyanoacrylates, rubber-based adhesives, acrylic-based adhesives, silicon-based adhesives, and hot-melt adhesives. Also, the spacer layer 203 may be formed from one or more adhesives that bond the protection layer 202 to the magnetic layer 201.

A user can use the handle 205 to ease the removal and mounting of the protector apparatus 20 on the printhead 10. In some embodiments, the handle 205 is a flag handle. The entire handle 205 may be flexible, or the handle 205 may be more rigid and have a pivot point where the handle 205 attaches to the distal layer 204 (or to the magnetic layer 201 in embodiments that exclude the distal layer 204).

Examples of materials that can constitute the handle 205 include the following: fabric, plastic (e.g., acrylonitrile butadiene styrene (ABS), polyvinyl chloride (PVC)), polypropylene, and metal. For example, the handle 205 may be composed of fabric or plastic to which an adhesive has been applied on one side (e.g., an adhesive tape). Also for example, in embodiments of the handle 205 in which the handle 205 has a T-shape and is made of tape, the handle 205 may be made as follows: The middle portion of a piece of tape is folded over itself so that the adhesive of one surface of the tape contacts the adhesive of the other surface of the tape. This creates a handle portion that is free of exposed adhesive. The remaining two ends, which have exposed adhesive, are affixed to the distal layer 204 or to the flexible magnetic layer 201 on the side of the protector apparatus 20 that does not contact the nozzle plate.

Also, the handle may have an L-shape, for example where the short end of the "L" has an exposed adhesive that is affixed to the distal layer 204 or to the flexible magnetic layer 201 and the long end of the "L" has no exposed adhesive and is not affixed to either the distal layer 204 or the flexible magnetic layer 201.

The handle 205 is not necessary for the protector apparatus 20 to protect the printhead 10. However, the handle 205 may improve user convenience and handling. In some circumstances, the handle 205 performs best by being placed close to a longitudinal end of the protector apparatus 20. This placement may require the lowest pull force to separate the protector apparatus 20 from the printhead 10.

Figure 8A:
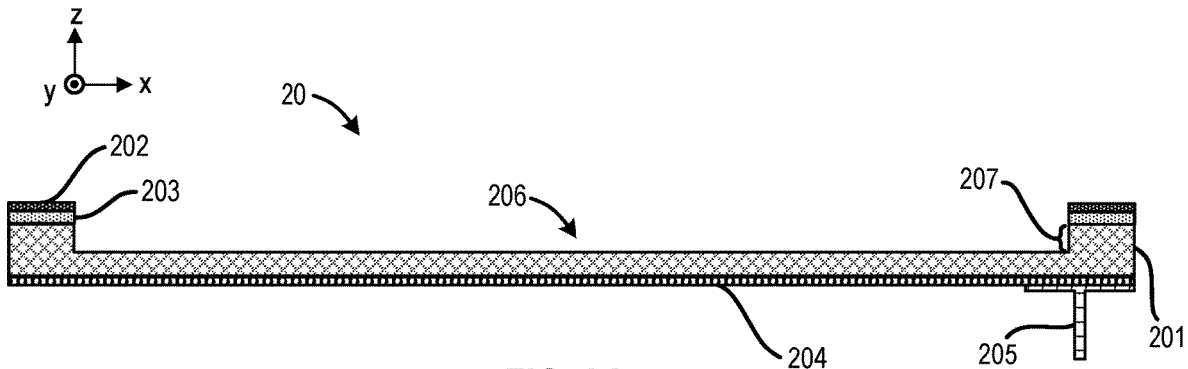
FIG. 8A illustrates a cutaway view of the protector apparatus from FIGS. 7A-7C.

Additionally, the handle 205 may be rotated, in the xy plane, by 90 degrees relative to the position shown in FIGS. 4A-B. Thus, instead of longitudinally extending along the y axis as shown in FIGS. 4A-B, the handle 205 may longitudinally extend along the x axis (e.g., as shown in FIG. 8C).

Embodiments of protector apparatuses 20 were applied to five different printheads 10 using different solutions on the printheads 10. The printheads 10 were subjected to the chemicals for a period of seven weeks. The protector apparatuses 20 were removed weekly for inspection. No damage was observed on the nozzle plates 102, and the data indicate that the protector apparatuses 20 did not cause damage (e.g., damaging reactions) to the nozzle plates 102 when applied for long periods.

The five test configurations were as follows: A protector apparatus 20 that had slippery protection layer 202, and a printhead 10 that was coated in storage solution. Another protector apparatus 20 that had a slippery protection layer 202, and a printhead 10 that was coated in storage solution. A protector apparatus 20 that had no protection layer 202, and a printhead 10 that was coated in storage solution. A protector apparatus 20 that had a slippery protection layer 202, and a printhead 10 that was coated in ink. A protector apparatus 20 that had a slippery protection layer 202, and a printhead 10 that was coated in 70% isopropyl alcohol.

Additionally, the printheads 10 with the aforementioned protector apparatuses 20 were placed on screws and nuts and were bumped into pneumatic hoses, bolt heads, and other components found in the mounting location in the printer 90. The protector apparatuses 20 prevented damage to the nozzle plates 102 that would have occurred if the protector apparatuses 20 were not in place.

Furthermore, coloring the protector apparatus 20 in a bright color or a combination of colors (e.g., a color pattern) may make it easier to see the protector apparatus 20 when mounted on the nozzle plate 102. This may make an installer less likely to leave the protector apparatus 20 on the nozzle plate 102 after installation. And adding a bright color or pattern (e.g., geometric or color pattern) to the handle 205 may help the installer see the handle 205 and remember to remove the protector apparatus 20 from the printhead 10 after installation.

Figure 5A:
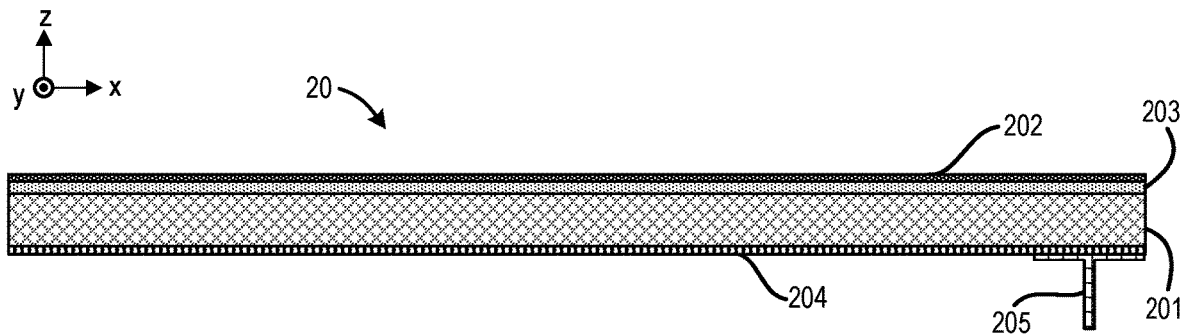
FIG. 5A illustrates a cutaway view of the protector apparatus from FIGS. 4A-4C.

FIG. 5A illustrates a cutaway view of the protector apparatus 20 from FIGS. 4A-4C. The cutaway view in FIG. 5A is taken from line AA in FIGS. 4B and 4C. This embodiment of the protector apparatus 20 includes a magnetic layer 201, a protection layer 202, a spacer layer 203, a distal layer 204, and a handle 205. And, in this embodiment, the protector apparatus 20 includes a T-shaped handle 205.

Figure 5B:
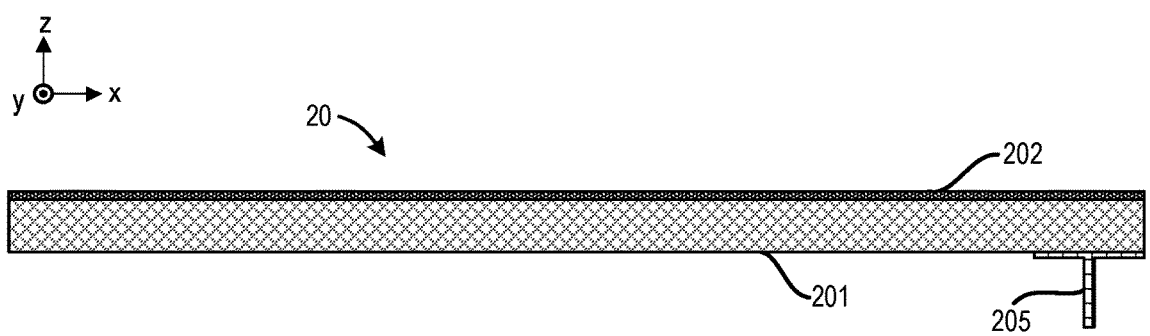
FIG. 5B illustrates a cutaway view of an example embodiment of a protector apparatus.

FIG. 5B illustrates a cutaway view of an example embodiment of a protector apparatus. This embodiment includes a magnetic layer 201, a protection layer 202, and a handle 205. Thus, this embodiment omits the spacer layer 203 and the distal layer 204. Also, an adhesive that bonds the magnetic layer 201 to the protection layer 202 may operate as the spacer layer.

Figure 5C:
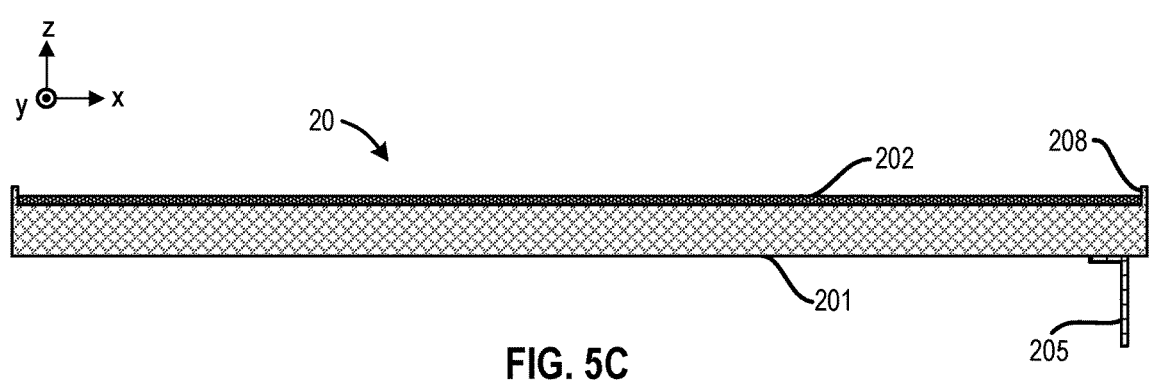
FIG. 5C illustrates a cutaway view of an example embodiment of a protector apparatus.

FIG. 5C illustrates a cutaway view of an example embodiment of a protector apparatus. This embodiment includes a magnetic layer 201, a protection layer 202, a handle 205, and a flange 208. Thus, this embodiment does not include a spacer layer 203 and does not include a distal layer 204. Also, in this embodiment, the handle 205 is L-shaped.

Figure 6A:
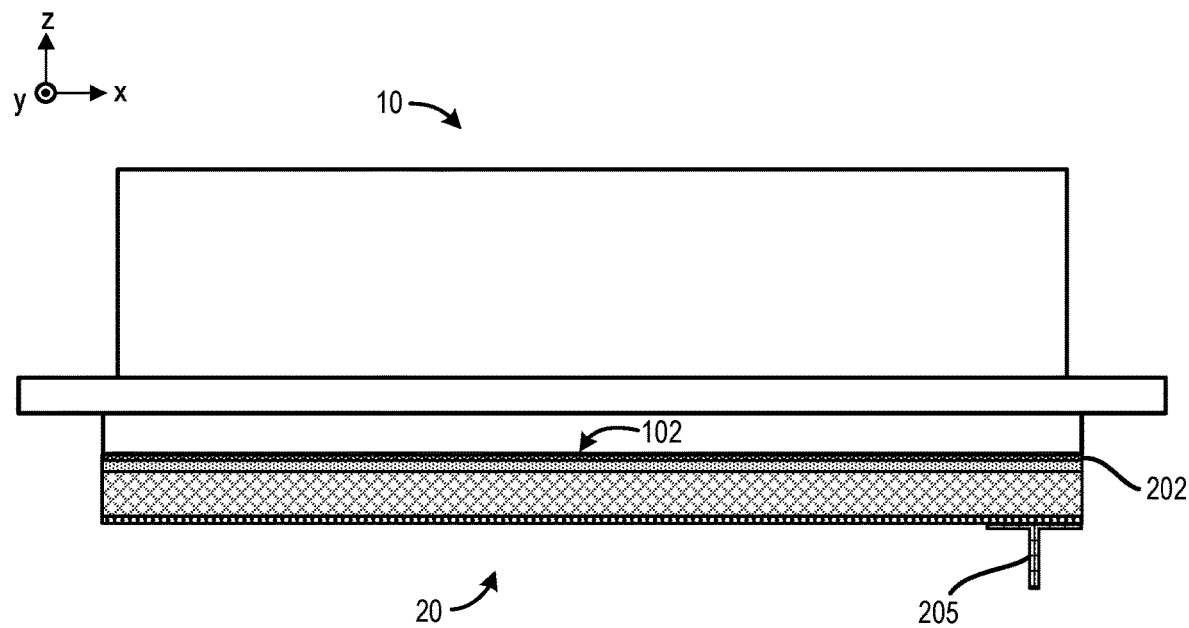
FIG. 6A illustrates an example embodiment of a printhead and a flexible protector apparatus.
Figure 6B:
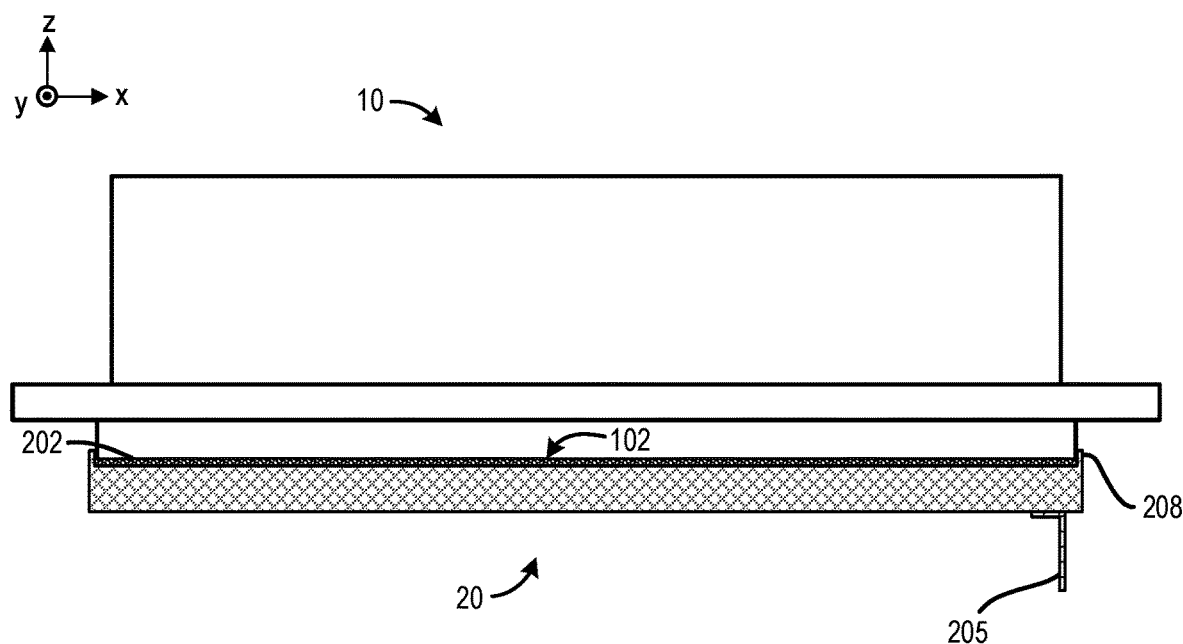
FIG. 6B illustrates an example embodiment of a printhead and a flexible protector apparatus.

This embodiment of a protector apparatus 20 has a length and a width that are sized such, when the protection layer 202 contacts the printhead 10, the flange 208 extends along the sides of the printhead 10 that are parallel to the z axis and prevents the protection apparatus 20 from sliding, relative to the printhead 10, along the x and y axes (e.g., as shown in FIG. 6B). Thus, the protector apparatus 20 is slightly longer and slightly wider than the nozzle plate 102.

Figure 5D:
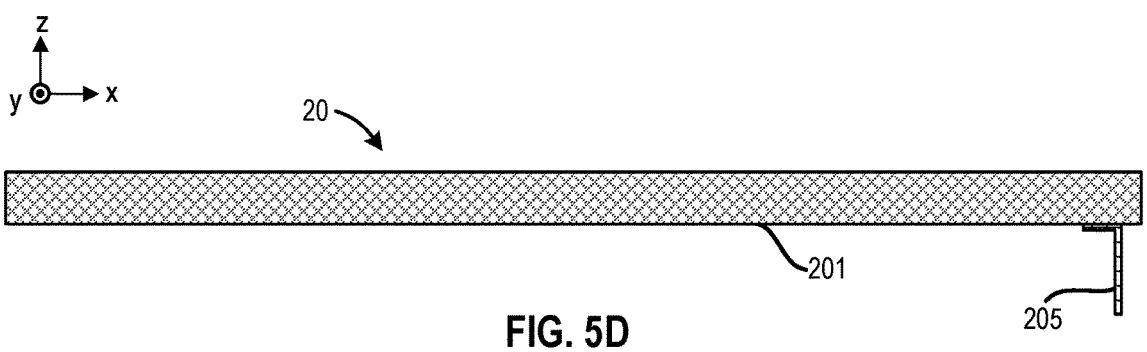
FIG. 5D illustrates a cutaway view of an example embodiment of a protector apparatus.

FIG. 5D illustrates a cutaway view of an example embodiment of a protector apparatus. This embodiment includes a magnetic layer 201 and a handle 205. In this embodiment, the surface of the magnetic layer 201 is smooth enough to prevent damage to the nozzle plate 102 when they are in contact with each other. Also, the surface of the magnetic layer 201 may have a very thin coating that makes the surface of the magnetic layer 201 smooth enough to avoid damaging the nozzle plate 102.

Thus, in some embodiments, the magnetic layer 201 has a relatively smooth surface and can directly contact the nozzle plate 102, particularly when used with the procedure of wetting the nozzle plate 102 of the printhead 10 to flush away any debris that may have adhered to the nozzle plate 102.

Also, the form factor (the length, the width, the shape) of the of the protector apparatus 20 may be the same as the nozzle plate 102 (or the nozzle area 103) of a printhead 10 that the protector apparatus 20 is specially configured to protect. Consequently, some embodiments of the protector apparatus 20 can be held to the printhead 10 without extending beyond the perimeter of the nozzle plate 102 (i.e., the edges of the protector apparatus 20 are flush with the edges of the nozzle plate 102). This allows the protector apparatus 20 to remain in place on the printhead 10 while the nozzle plate 102 is pushed through a mounting cutout (e.g., the mounting cutout 932 in FIG. 2B) and the printhead 10 is secured in place in the printer 90. And the protector apparatus 20 can remain in place on the printhead 10 regardless of the design of the mounting cutout 932 in the printer 90. For example, some embodiments of protector apparatuses 20 can be used during installation and removal in printers that have a mounting cutout 932 that has very little clearance. And a protector apparatus 20 that can remain in place during installation and removal can be advantageous because often most of the damage to a nozzle plate 102 occurs during installation.

In embodiments that include the flange 208, the flange 208 may have a thickness (the distance between an outer perimeter of the flange 208 and an inner perimeter of the flange 208) that is less than the clearance. Because the clearance between the printhead 10 and the mounting cutout 932 may be less than a millimeter on each side, some embodiments of the flange 208 have a thickness that is less than a millimeter. This allows the embodiments that include the flange 208 to be used during installation and removal of the printhead 10 when the clearance is so limited.

FIG. 6A illustrates an example embodiment of a printhead and a flexible protector apparatus. In FIG. 6A, the flexible protector apparatus 20 from FIG. 5A (which is also shown in cutaway view in FIG. 6A) is magnetically held to a printhead 10. As shown in FIG. 6A, the protection layer 202 contacts the nozzle plate 102 of the printhead 10.

FIG. 6B illustrates an example embodiment of a printhead and a flexible protector apparatus. In FIG. 6B, the flexible protector apparatus 20 from FIG. 5C (which is also shown in cutaway view in FIG. 6B) is magnetically held to a printhead 10. As shown in FIG. 6B, the protection layer 202 contacts the nozzle plate 102 of the printhead 10. And the flange 208 prevents the protector apparatus 20 from moving in the xy plane relative to the printhead 10.

Figure 7A:
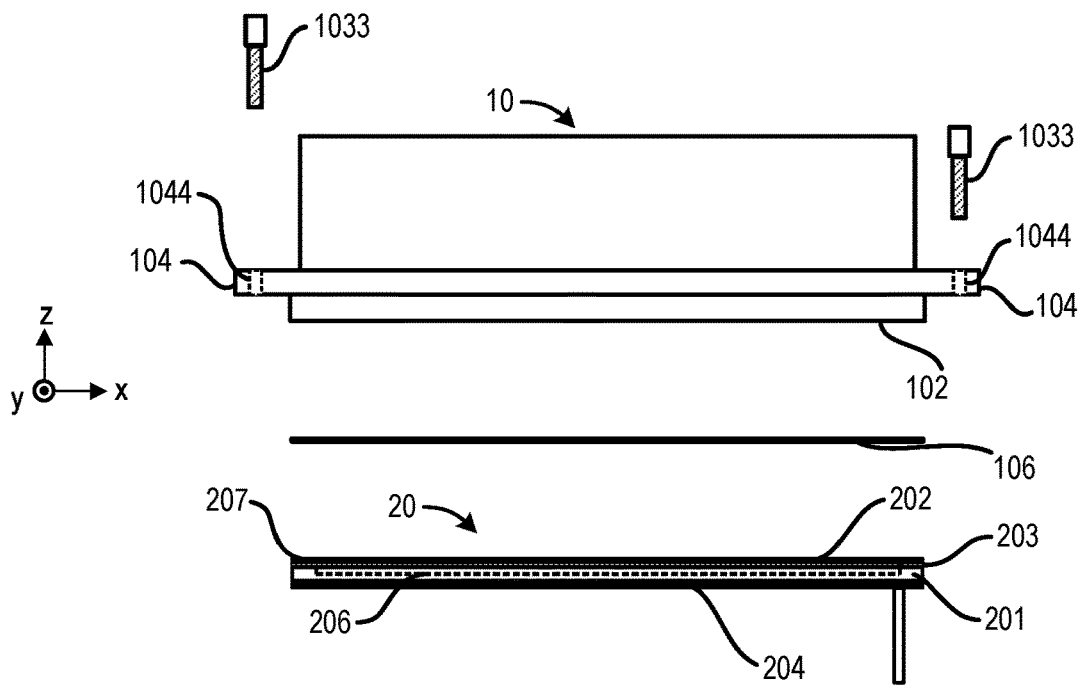
FIG. 7A illustrates an example embodiment of a printhead and a flexible protector apparatus.
Figure 7B:
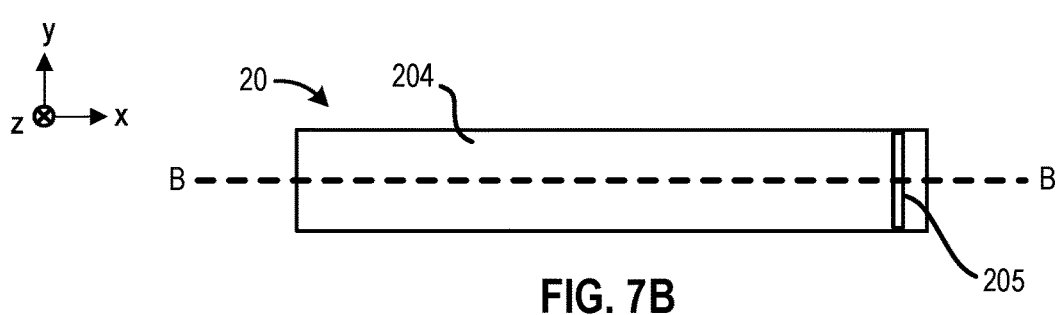
FIG. 7B illustrates another view of the protector apparatus from FIG. 7A.
Figure 7C:
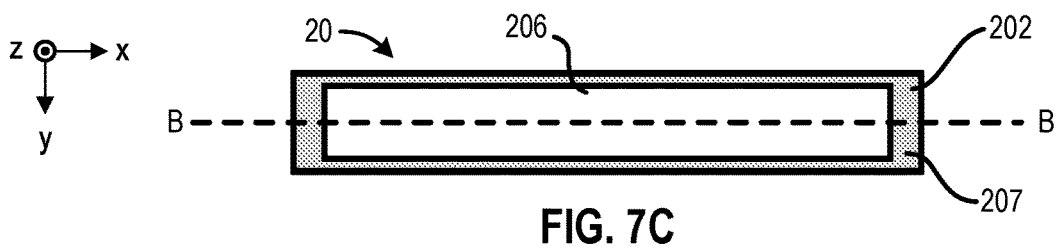
FIG. 7C illustrates another view of the protector apparatus from FIG. 7A.
Figure 7D:
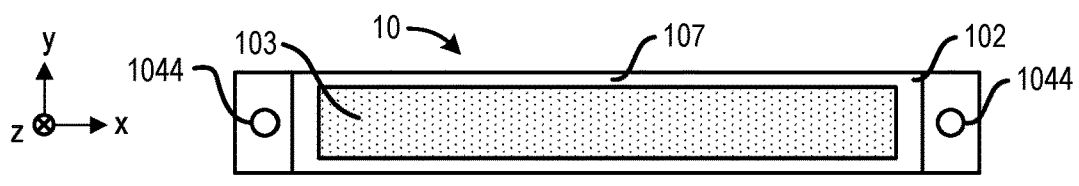
FIG. 7D illustrates another view of the printhead from FIG. 7A.

FIG. 7A illustrates an example embodiment of a printhead 10 and a flexible protector apparatus 20. And FIG. 7B illustrates another view of the protector apparatus 20 from FIG. 7A, from a viewpoint looking upwards along the z axis; FIG. 7C illustrates another view of the protector apparatus 20 from FIG. 7A, from a viewpoint looking downwards along the z axis; and FIG. 7D illustrates another view of the printhead 10 from FIG. 7A, from a viewpoint looking upwards along the z axis. Thus, the views of FIGS. 7B-D are orthogonal to the view of FIG. 7A. Furthermore, FIG. 8A illustrates a cutaway view of the protector apparatus 20 from FIGS. 7A-C. The cutaway view in FIG. 8A is taken from line BB in FIGS. 7B and 7C.

In the embodiment in FIGS. 7A-C and FIG. 8A, the protector apparatus 20 has a depression 206 (a recessed area) in a central portion of the surface that faces the printhead 10. Also, the depression 206 is surrounded by a platform 207 (an area that is raised relative to the depression 206). The platform 207 lies along the perimeter (e.g., traces the perimeter, inscribes the perimeter) of the surface that faces the printhead 10. And, in this embodiment, the platform 207 is formed by the magnetic layer 201. A protection layer 202 and a spacer layer 203 are positioned on the platform 207, and thus can also be described as constituting part of the platform 207.

Also, on the nozzle plate 102 of the printhead 10, the nozzle area 103 is surrounded by a nozzle-area border 107 that does not include nozzles. For example, in some embodiments of the nozzle plate 102, each of the long sides (the sides that are parallel to the x axis in FIGS. 7A-D) has a 2 mm space that is void of nozzles, and each of the short sides (the sides that are parallel to the y axis in FIGS. 7A-D) has a 10 mm space that is void of nozzles.

The depression 206 prevents the protector apparatus 20 from contacting the nozzle area 103 of the nozzle plate 102. When the protector apparatus 20 is brought into contact with the printhead 10, the platform 207 of the protector apparatus 20 contacts the nozzle-area border 107 on the nozzle plate 102 (or contacts a film or foil that has been applied to the nozzle-area border 107). However, because the nozzle area 103 is positioned over the depression 206, the protector apparatus 20 does not contact the nozzle area 103 (or a film or foil that has been applied to the nozzle area 103). Thus, the depression 206 can reduce or prevent damage to the nozzles even if the nozzle plate 102 has some debris or contamination. Also, the protector apparatus 20 may be sized such that the outer edges of the platform 207 are flush with the edges of the nozzle plate 102 when the protector apparatus 20 is magnetically held to (and properly aligned with) the printhead 10.

Figure 8B:
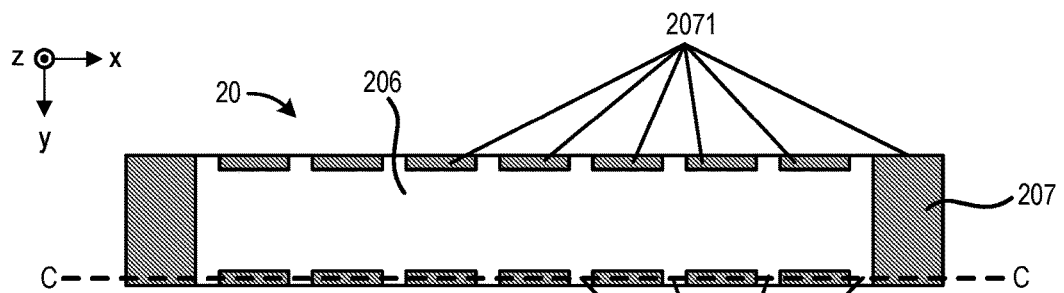
FIG. 8B illustrates an example embodiment of a protector apparatus.
Figure 8C:
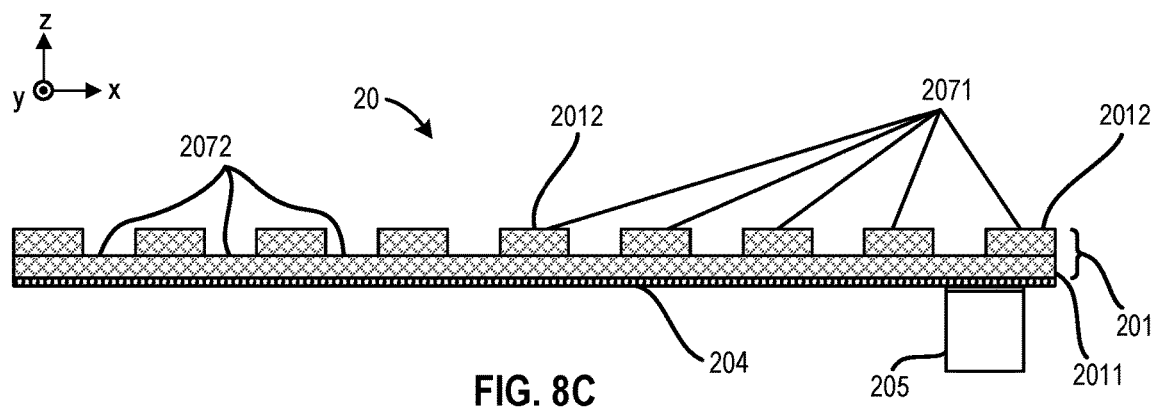
FIG. 8C illustrates a cutaway view of the protector apparatus from FIG. 8B.

FIG. 8B illustrates an example embodiment of a protector apparatus, and FIG. 8C illustrates a cutaway view of the protector apparatus from FIG. 8B, taken from the line CC in FIG. 8B. In this embodiment, the platform 207 of the protector apparatus 20 includes platform sections 2071 that are separated by gaps 2072. The platform sections 2071 and the gaps 2072 may give the protector apparatus 20 extra flexibility or may reduce the wear on the platform 207 that is caused by repeated bending of the protector apparatus 20. Also, other embodiments may include more or fewer gaps 2072. In FIGS. 8B-C, the sides of the platform 207 that extend parallel to the longitudinal axis of the protector apparatus 20 include the gaps 2072 (in FIGS. 8B-C, the sides that are parallel to the longitudinal axis are parallel to the x axis). However, in some embodiments the sides of the platform 207 that extend perpendicular to the longitudinal axis of the protector apparatus 20 (in FIGS. 8B-C, the sides that are perpendicular to the longitudinal axis are parallel to the y axis) include gaps as well as, or in alternative to, the sides of the platform 207 that extend parallel to the longitudinal axis of the protector apparatus 20. Also, in FIG. 8C, the handle 205 is rotated in the xy plane by 90 degrees relative to the handle 205 in FIG. 8A.

Furthermore, in FIGS. 8B-C, the magnetic layer 201 includes multiple layers that are layered and bonded together. These layers are referred to herein as sublayers of the magnetic layer 201. In this embodiment, a first magnetic sublayer 2011 forms the base (e.g., floor) of the depression 206, and a second magnetic sublayer 2012 forms the platform 207. For example, each of the platform sections 2071 may be formed, at least in part, by bonding a respective smaller flexible magnetic sheet (which constitutes part of the second sublayer 2012) to a larger magnetic sheet (which constitutes the first sublayer 2011). Also, the platform sections 2071 may each include a protection layer 202 or a spacer layer 203.

Figure 9A:
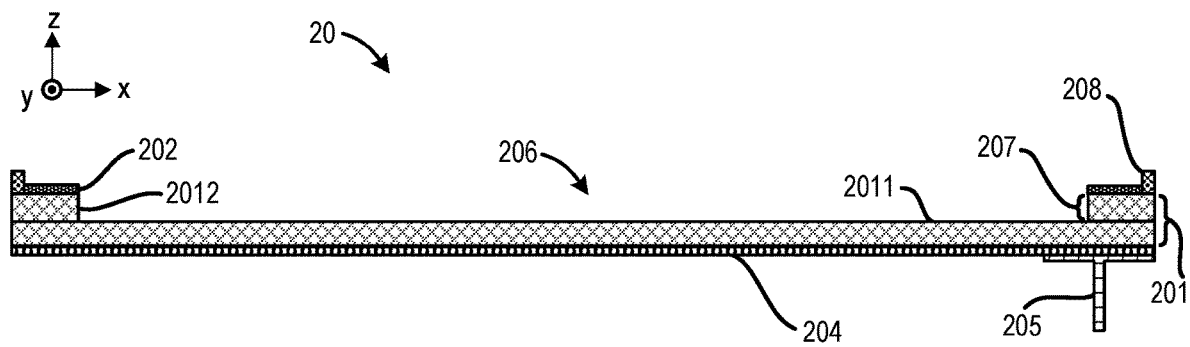
FIG. 9A illustrates a cutaway view of an example embodiment of a protector apparatus.

FIG. 9A illustrates a cutaway view of an example embodiment of a protector apparatus. This embodiment of the protector apparatus 20 includes a magnetic layer 201, a protection layer 202, a distal layer 204, a handle 205, a depression 206, a platform 207, and a flange 208. Thus, this embodiment omits the spacer layer 203. Also, in this embodiment, the flange 208 consists of non-magnetic material. And a first magnetic sublayer 2011 forms the base of the depression 206, and a second magnetic sublayer 2012 forms part of the platform 207.

Figure 9B:
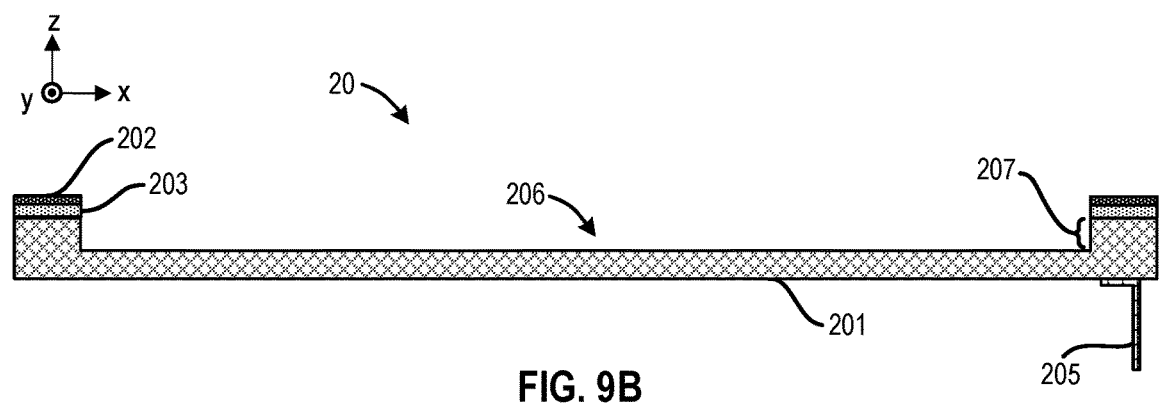
FIG. 9B illustrates a cutaway view of an example embodiment of a protector apparatus.

FIG. 9B illustrates a cutaway view of an example embodiment of a protector apparatus. This embodiment of the protector apparatus 20 includes a magnetic layer 201, a protection layer 202, a spacer layer 203, a handle 205, a depression 206, and a platform 207.

Figure 9C:
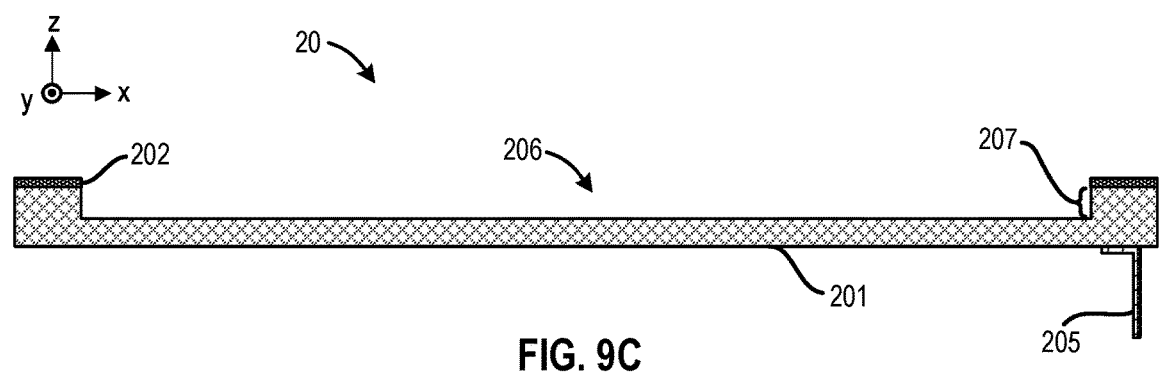
FIG. 9C illustrates a cutaway view of an example embodiment of a protector apparatus.

FIG. 9C illustrates a cutaway view of an example embodiment of a protector apparatus. This embodiment of the protector apparatus 20 includes a magnetic layer 201, a protection layer 202, a handle 205, a depression 206, and a platform 207.

Accordingly, as shown by the foregoing embodiments, some embodiments of protector apparatuses 20 can be coupled (magnetically held) to a printhead 10 without the use of a fastener (e.g., a screw) or other additional hardware (straps, clamps), which allows the protector apparatuses 20 to be quickly attached and removed. Moreover, the handle 205 can reduce the pull force needed to remove the protector apparatus 20, which also reduces the overall pull force applied to the nozzle plate 102.

Figure 10A:
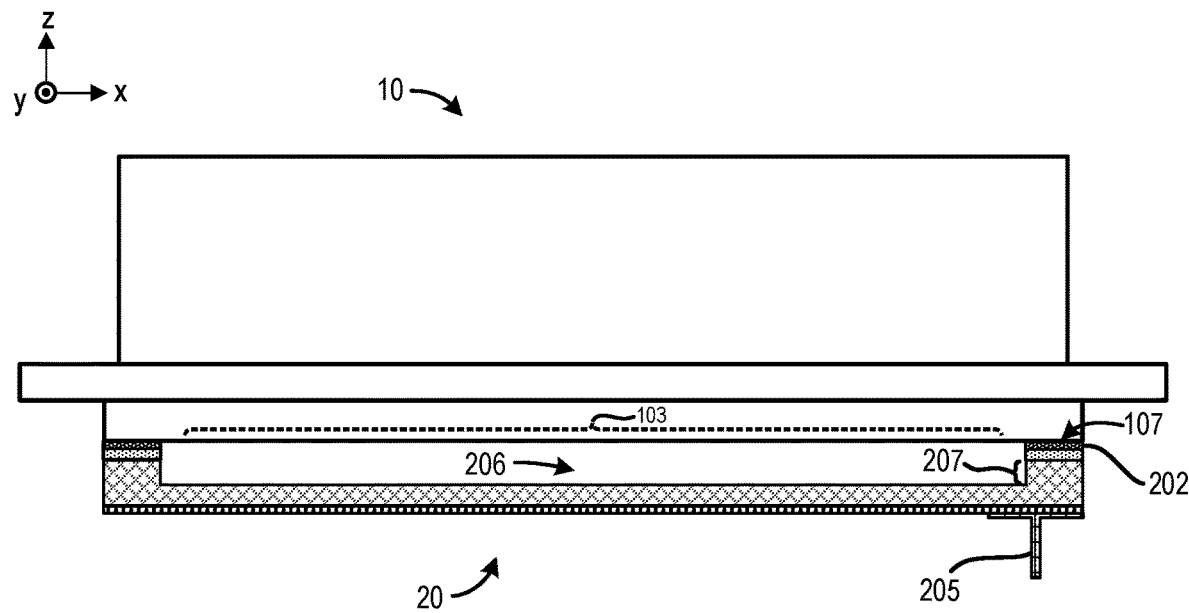
FIG. 10A illustrates an example embodiment of a printhead and a flexible protector apparatus.

FIG. 10A illustrates an example embodiment of a printhead and a flexible protector apparatus. In FIG. 10A, the flexible protector apparatus 20 from FIG. 8A (which is also shown in cutaway view in FIG. 10A) is magnetically held to a printhead 10. The protection layer 202 on the platform 207 of the protector apparatus 20 contacts the nozzle-area border 107 of the nozzle plate 102. The nozzle area 103 is held over the depression 206 of the protector apparatus 20. Thus, the protector apparatus 20 does not contact the nozzle area 103.

Figure 10B:
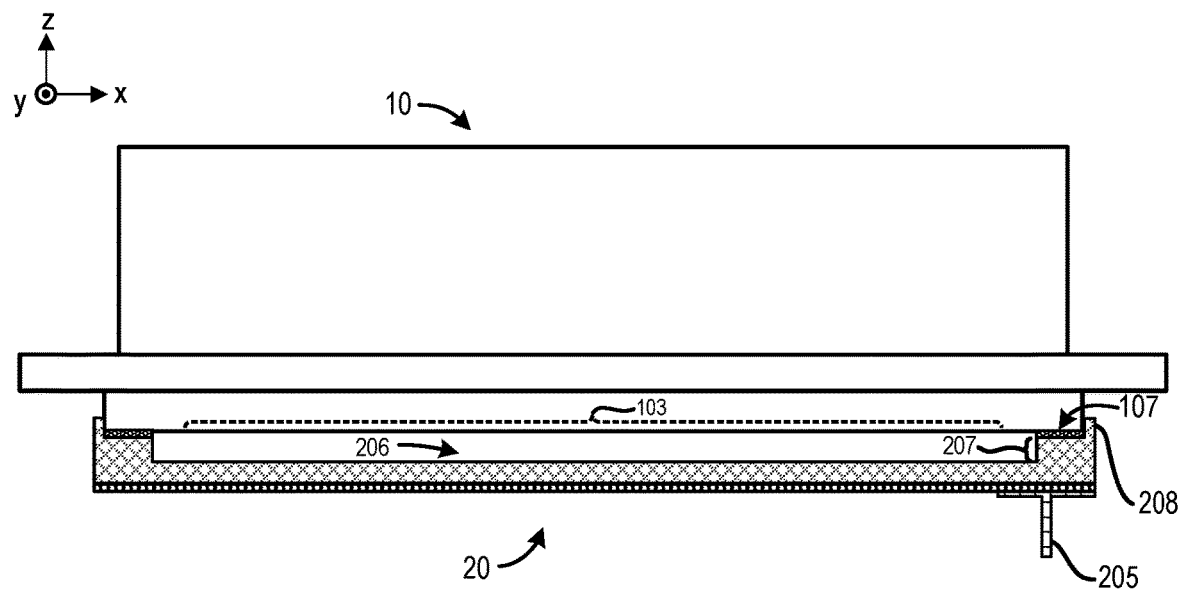
FIG. 10B illustrates an example embodiment of a printhead and a flexible protector apparatus.

FIG. 10B illustrates an example embodiment of a printhead and a flexible protector apparatus. In FIG. 10B, the flexible protector apparatus 20 from FIG. 9A (which is also shown in cutaway view in FIG. 10B) is magnetically held to a printhead 10. The protection layer 202 on the platform 207 of the protector apparatus 20 contacts the nozzle-area border 107 of the nozzle plate 102. The nozzle area 103 of the printhead 10 is held over the depression 206 of the protector apparatus 20. Thus, the protector apparatus 20 does not contact the nozzle area 103. And the flange 208 prevents the protector apparatus 20 from moving in the xy plane relative to the printhead 10.

Figure 11A:
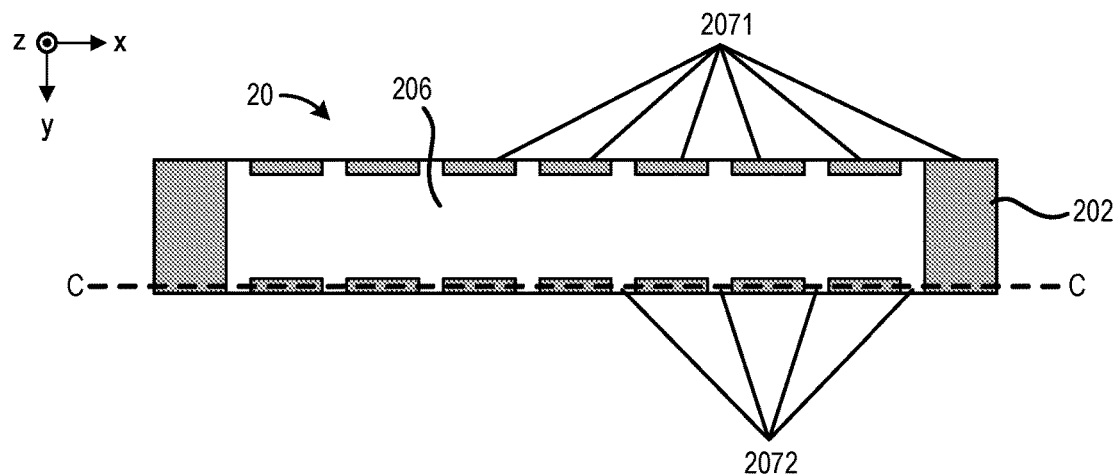
FIG. 11A illustrates an example embodiment of a protector apparatus.
Figure 11B:
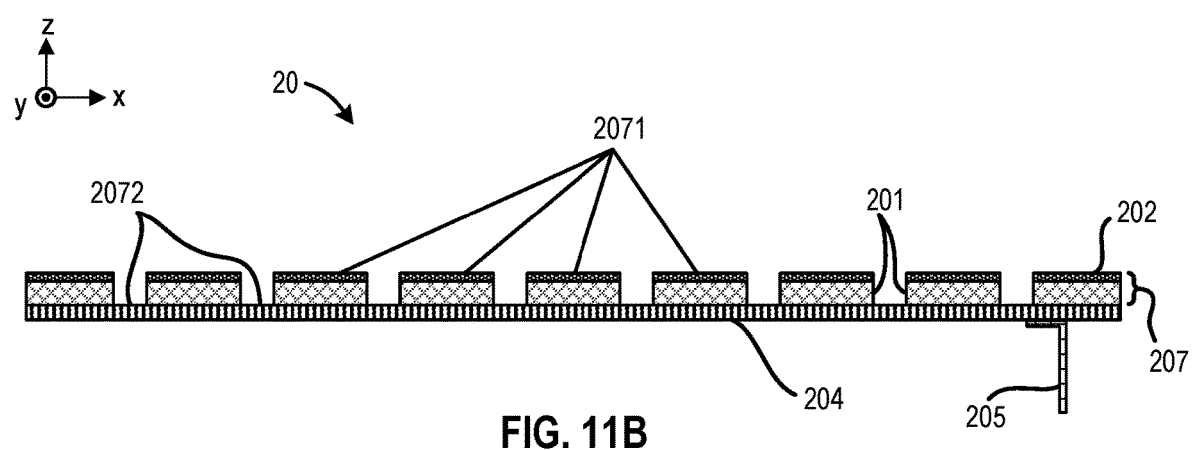
FIG. 11B illustrates a cutaway view of the protector apparatus from FIG. 11A.

FIG. 11A illustrates an example embodiment of a protector apparatus, and FIG. 11B illustrates a cutaway view of the protector apparatus from FIG. 11A. In this embodiment, the magnetic layer 201 is composed of independent segments that are each affixed to a distal layer 204 and that do not contact each other. And each of the independent segments of the magnetic layer 201 forms a part of a respective platform section 2071. Also, the distal layer 204 forms the base of the depression 206.

Figure 11C:
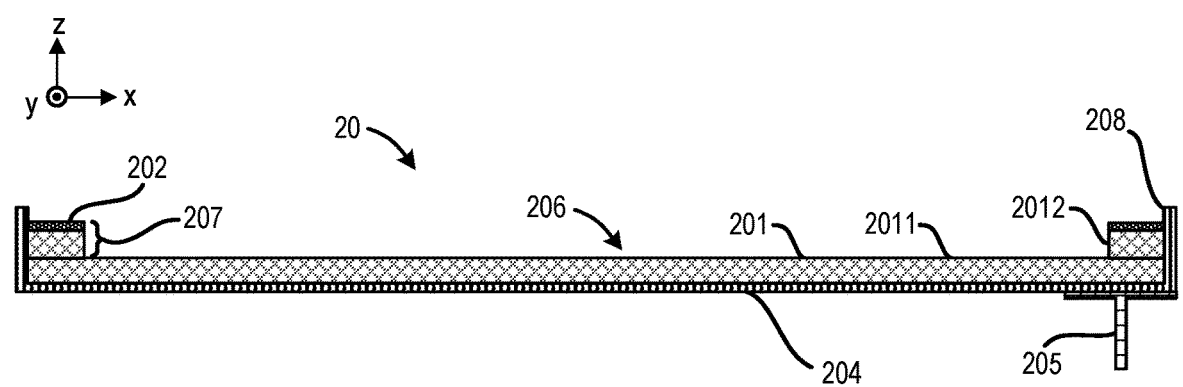
FIG. 11C illustrates a cutaway view of an example embodiment of a protector apparatus.

FIG. 11C illustrates a cutaway view of an example embodiment of a protector apparatus. In this embodiment, the distal layer 204 also extends upward around the periphery of the protector apparatus 20 to form the flange 208. The upward-extending portions of the distal layer 204 may have cuts or breaks to allow the upward-extending portions to bend more easily.

Figure 12:
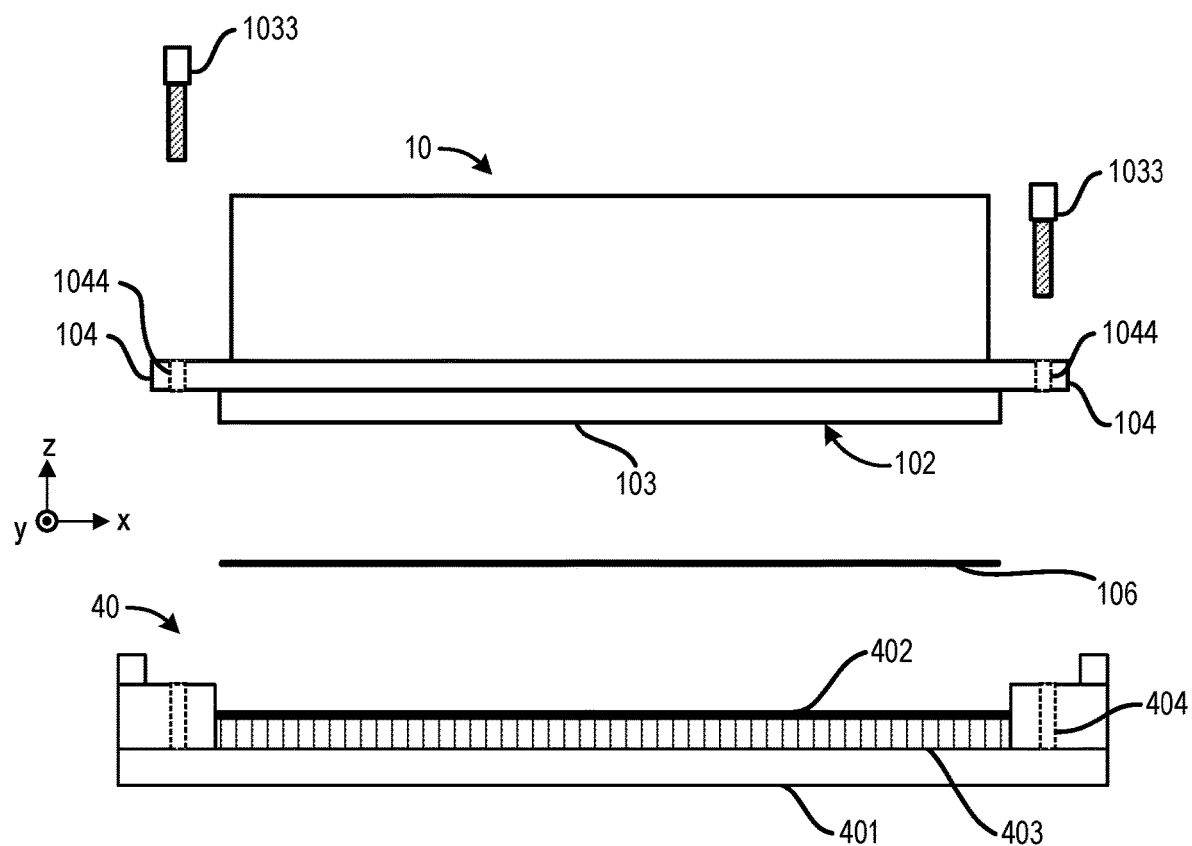
FIG. 12 illustrates an example embodiment of a printhead and a rigid protector.

FIG. 12 illustrates an example embodiment of a printhead 10 and a rigid protector 40. In this embodiment, the rigid protector 40 includes a rigid metal body 401, a protection foil 402, a compressible pad 403, and two screw holes 404. The screw holes 404 can be used to attach the rigid protector 40 to the printhead 10 by using screws 1033 that are inserted through the two mounting members 104 into the two screw holes 404.

The rigid metal body 401 may provide good protection during shipping and storage. However, because the rigid protector 40 must extend at least to the openings 1044 in the two mounting members 104, the rigid protector 40 is longer (on the x axis in FIG. 12) than the length of the nozzle plate 102 of the printhead 10 and is longer than the distance between the two openings 1044. Consequently, this rigid protector 40 will not fit in a mounting cutout 932, and this rigid protector 40 must be removed before the printhead 10 is installed in a printer 90. Therefore, the printhead 10 is exposed and unprotected during installation and removal, and the nozzle plate 102 can be damaged when it contacts an object on its route to its mounting position.

Figure 13A:
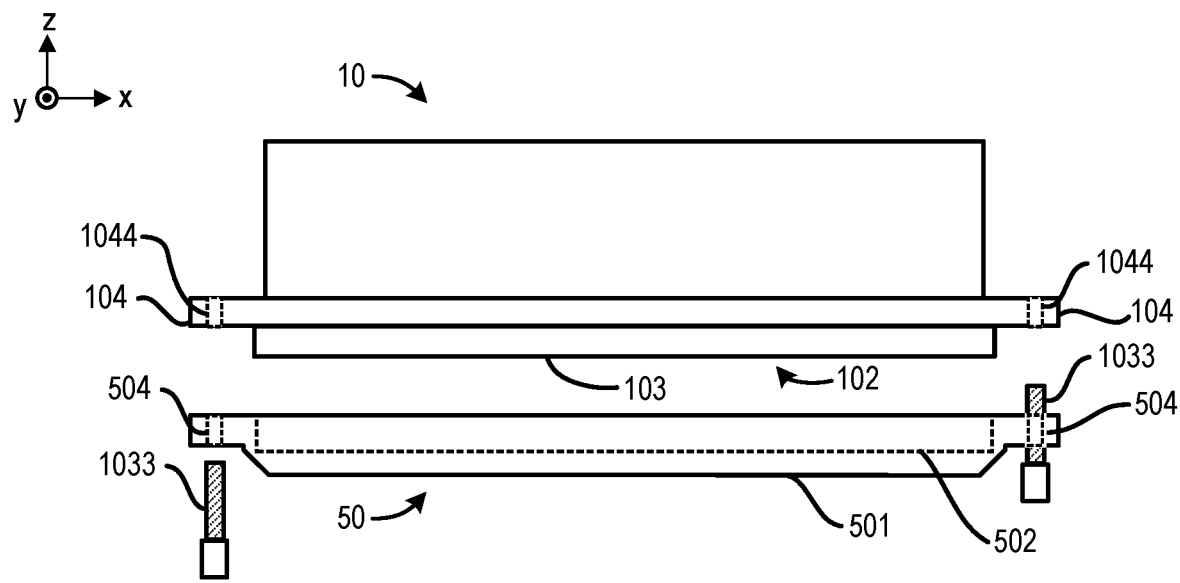
FIG. 13A illustrates an example embodiment of a printhead and a rigid protector.

FIG. 13A illustrates an example embodiment of a printhead and a rigid protector. And FIG. 13B illustrates another view of the rigid protector from FIG. 13A.

In this embodiment, the rigid protector 50 includes a rigid metal body 501, a depression 502, a platform 503, and two screw holes 504. The screw holes 504 can be used to attach the rigid protector 50 to the printhead 10 by using screws 1033 that are inserted through the two screw holes 504 into the openings 1044 in the two mounting members 104. The depression 502 is large enough to accommodate the entire nozzle plate 102 of the printhead 10. And the depression 502 is so deep that, when the rigid protector 50 is attached to the printhead 10, the bottom surface of the depression 502 does not contact the nozzle plate 102.

Some printers may have a mounting cutout 932 that is large enough to accommodate this rigid protector 50. So this rigid protector 50 can be used during removal and installation of the printhead 10, but only in printers that were designed with the larger mounting cutouts 932. And, because this rigid protector 50 is attached to the printhead 10 by screws, this rigid protector 50 requires more time to attach and remove. Additionally, this rigid protector 50 does not have a moisture barrier surface that contacts the nozzle plate 102, so installers have less time before they need to be concerned about the nozzle plate drying out.

Figure 13B:
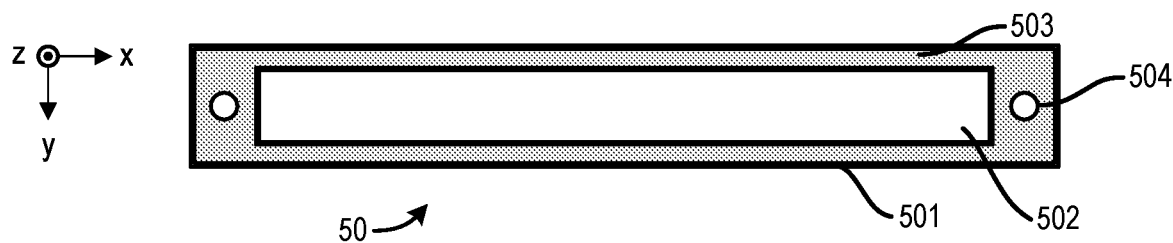
FIG. 13B illustrates another view of the rigid protector from FIG. 13A.

Also, some embodiments of the protector apparatuses 20 in FIGS. 4A-C, 5A-D, 6A-B, 7A-C, 8A-C, 9A-C, 10A-B, and 11A-C can be used with the rigid protector 40 in FIG. 12 or with the rigid protector 50 in FIGS. 13A-B. Such combinations can reduce or eliminate nozzle-plate damage when mounting the printhead 10 to the rigid protector 40 in FIG. 12 or to the rigid protector 50 in FIGS. 13A-B. For example, when a printhead 10 is being packed for shipment, a flexible protector apparatus 20 may first be attached to the printhead 10, and then the printhead 10, with the attached protector apparatus 20, may be attached to a rigid protector 40. During installation, the rigid protector 40 can be removed, and the printhead 10 can be installed while still attached to the flexible protector apparatus 20. This means that, from the time of packing the printhead 10 through shipping and installation, the printhead 10 will be protected. And attaching a flexible protector apparatus 20 at the factory or point of packaging for transportation reduces field-service time by eliminating the need to attach a flexible protector apparatus 20 in the field before installing the printhead 10.

While the present disclosure has described exemplary embodiments, it is to be understood that some embodiments are not limited to the disclosed exemplary embodiments. The scope of the following claims is to be accorded the broadest interpretation so as to encompass all modifications, equivalent structures and functions

What is claimed is:

1. A protector apparatus for protecting a printhead having a nozzle plate, the protector apparatus comprising:
    a protection layer;
    a spacer layer;
    a flexible magnetic layer having a first surface and a second surface opposing the first surface; and
    a handle connected to one end of the flexible magnetic layer,
    wherein the spacer layer is sandwiched between the protection layer and the first surface of the flexible magnetic layer such that the spacer layer is interposed between the protection layer and the first surface of the flexible magnetic layer,
    wherein the handle is connected to the second surface of the flexible magnetic layer, and
    wherein the protector apparatus can be magnetically attached to the printhead in such a manner that the first protection layer covers the nozzle plate.

2. The protector apparatus of claim 1, wherein the protection layer is a plastic foil.

3. The protector apparatus of claim 1, wherein the handle has a flexible body.

4. The protector apparatus of claim 1, wherein the handle is composed of plastic or fabric.

5. The protector apparatus of claim 1, wherein the spacer layer is composed of an adhesive that bonds the protection layer to the flexible magnetic layer.

6. The protector apparatus of claim 1, wherein the spacer layer is composed of a low-durometer material.

7. The protector apparatus of claim 1, wherein the flexible magnetic layer includes one or more flexible magnets.

8. The protector apparatus of claim 1, wherein the flexible magnetic layer includes a plurality of rigid magnets with flexible joints therebetween that allow the flexible magnetic layer to bend at the flexible joints.

9. A protector apparatus for protecting a printhead having a nozzle plate, the protector apparatus comprising:
    a flexible magnetic layer having a first side, a second side opposing the first side, and a perimeter, wherein the flexible magnetic layer has a platform that lies along the perimeter of the first side to define a depression in a central portion of the first side;
    a protection layer, wherein the protection layer is positioned on the platform; and
    a handle connected to one end of the protector apparatus,
    wherein the platform and the cavity are sized such that, when the platform contacts a printhead, a nozzle plate of the printhead does not contact the platform.

10. The protector apparatus of claim 9, further comprising:
    a spacer layer that is sandwiched between the protection layer and the flexible magnetic layer.

11. The protector apparatus of claim 9, wherein the handle is connected to the second side of the flexible magnetic layer.

12. The protector apparatus of claim 9, further comprising:
    a distal layer that lies on the second side of the flexible magnetic layer,
    wherein the handle is connected to the distal layer.

13. An apparatus comprising:
    a printhead, wherein the printhead has a nozzle plate on a nozzle-plate side; and
    a protector apparatus that is magnetically held to the nozzle-plate side of the printhead, wherein the protector apparatus includes:
        a protection layer;
        a flexible magnetic layer having a first surface on a first side and a second surface on a second side opposite to the first side; and
        a handle connected to one end of the protector apparatus,
    wherein the protection layer is on the first side of the flexible magnetic layer,
    wherein the handle is on the second side of the flexible magnetic layer,
    wherein the first side of the flexible magnetic layer faces the nozzle-plate side of the printhead,
    wherein a length of the protector apparatus does not exceed a length of the nozzle-plate side, and
    wherein a width of the protector apparatus does not exceed a width of the nozzle-plate side.

14. The apparatus of claim 13, wherein the protection layer is a plastic foil.

15. The apparatus of claim 13, wherein the handle is flexible.

16. The apparatus of claim 13, wherein the handle is composed of plastic or fabric.

17. The apparatus of claim 13, wherein the flexible magnetic layer includes one or more flexible magnets.

* * * * *